US011293318B2

(12) United States Patent
Salsgiver et al.

(10) Patent No.: US 11,293,318 B2
(45) Date of Patent: Apr. 5, 2022

(54) DIESEL EXHAUST PARTICULATE COLLECTORS (71) Applicants: Robert S. Salsgiver, Granite Falls, WA (US); Robert Benjamin, Snohomish, WA (US); Kelson J. Majerle, Lake Stevens, WA (US); Kent A. McColley, Lake Stevens, WA (US); Jason C. Board, Snohomish, WA (US); Richard D. Taylor, Arlington, WA (US); Cole L. Waldo, Granite Falls, WA (US)

(72) Inventors: Robert S. Salsgiver, Granite Falls, WA (US); Robert Benjamin, Snohomish, WA (US); Kelson J. Majerle, Lake Stevens, WA (US); Kent A. McColley, Lake Stevens, WA (US); Jason C. Board, Snohomish, WA (US); Richard D. Taylor, Arlington, WA (US); Cole L. Waldo, Granite Falls, WA (US)

(73) Assignee: FSX Equipment, Inc., Granite Falls, WA (US)

( * ) Notice: Subject to any disclaimer, the term of this patent is extended or adjusted under 35 U.S.C. 154(b) by 526 days.

(21) Appl. No.: 15/330,410

(22) Filed: Sep. 15, 2016

(65) Prior Publication Data
US 2017/0211440 A1 Jul. 27, 2017

Related U.S. Application Data (60) Provisional application No. 62/283,952, filed on Sep. 15, 2015.

(51) Int. Cl.
F01N 3/023 (2006.01)
B01D 41/04 (2006.01)
(Continued)

(52) U.S. Cl.
CPC ............ F01N 3/023 (2013.01); B01D 41/04 (2013.01); F01N 3/0233 (2013.01);
(Continued)

(58) Field of Classification Search
CPC ...... F01N 3/023; F01N 3/0233; F01N 3/0237; F01N 3/035; F01N 3/06; F01N 9/002;
(Continued)

(56) References Cited

U.S. PATENT DOCUMENTS 4,535,588 A    8/1985  Saito et al.
4,573,317 A    3/1986  Ludecke
(Continued)

FOREIGN PATENT DOCUMENTS

BE        1 017 587       1/2009
DE    102008038026 A1 *   2/2010  ............. F01N 3/023
(Continued)

Primary Examiner — Devon C Kramer
Assistant Examiner — Kelsey L Stanek
(74) Attorney, Agent, or Firm — FisherBroyles, LLP; Charles C. Hagadorn, III (57) ABSTRACT An apparatus and method for cleaning ash/soot and other particulates from diesel particulate filters (DPF), including diesel oxidative catalysts (DOC) and similar exhaust components. Section for dry and wet cleaning include conduits that connect to the filters. For dry cleaning, a filter is mounted clean side up and air pressure is applied in opposite directions so that the particulate is dislodged and falls out. For wet cleaning, the filter is floated with a slug of liquid cleaning solution which is surged back-and-forth through the filter to dislodge and remove the particulate. The dry and wet cleaning sections may be combined or collocated, or may be located separately or used one without the other.

13 Claims, 5 Drawing Sheets (51) Int. Cl.
*F01N 3/035* (2006.01)
*F01N 9/00* (2006.01)
*F02B 3/06* (2006.01)

(52) U.S. Cl.
CPC ........... *F01N 3/0237* (2013.01); *F01N 3/035* (2013.01); *F01N 9/002* (2013.01); *F02B 3/06* (2013.01); *F02D 2200/0812* (2013.01)

(58) Field of Classification Search
CPC ........... F01N 9/00; B01D 41/04; B01D 23/24; B01D 24/44; B01D 24/46; B01D 29/0075; B01D 29/0079; B01D 29/0081; B01D 29/0084; B01D 29/62; B01D 33/44; B01D 33/48; B01D 46/0032; B01D 46/0067; B01D 46/0071; B01D 46/0079; B01D 46/0057–0098; F02B 3/06; F02D 2200/0812
USPC ...... 60/295; 210/106; 55/522–527, 282–305; 95/281, 228–233
See application file for complete search history.

(56) References Cited

U.S. PATENT DOCUMENTS

| | | |
|---|---|---|
| 4,630,438 A | 12/1986 | Motohiro |
| 5,410,977 A | 5/1995 | Webb |
| 5,860,381 A | 1/1999 | Fernandini |
| 6,596,174 B1 * | 7/2003 | Marcus ................. F02M 37/28 210/695 |
| 6,758,039 B2 | 7/2004 | Kuboshima et al. |
| 6,902,599 B2 | 6/2005 | Bardon |
| 6,962,046 B2 | 11/2005 | Kuboshima et al. |
| 7,146,804 B2 | 12/2006 | Yahata et al. |
| 7,582,141 B2 | 9/2009 | Ehlers |
| 8,048,207 B1 | 11/2011 | Streichsbier et al. |
| 8,206,492 B2 | 6/2012 | Waldo |
| 8,256,060 B2 * | 9/2012 | Wagner ................. F01N 3/0233 15/319 |
| 2006/0150887 A1 | 7/2006 | Liang |
| 2010/0307339 A1 * | 12/2010 | Tadrous ............. B01D 46/2418 95/280 |
| 2012/0111370 A1 * | 5/2012 | Milles ................. F01N 3/0233 134/22.18 |
| 2014/0014595 A1 * | 1/2014 | Koo ....................... B01D 29/66 210/791 |
| 2014/0053865 A1 | 2/2014 | Weiland et al. |
| 2018/0128137 A1 * | 5/2018 | Case .................... G07C 5/0816 |

FOREIGN PATENT DOCUMENTS

| | | | |
|---|---|---|---|
| DE | 200810038026 | 2/2010 | |
| EP | 2 500 078 | 10/2012 | |
| EP | 2 554 808 | 2/2013 | |
| FR | 2794992 | 6/1999 | |
| FR | 2794992 A1 * | 12/2000 | ............ B01D 41/04 |
| FR | 2838981 | 10/2003 | |
| GB | 2 472 104 | 1/2011 | |
| WO | WO2005/012079 | 2/2005 | |

* cited by examiner

DIESEL EXHAUST PARTICULATE COLLECTORS

RELATED APPLICATIONS

This application claims the benefit of U.S. Provisional Patent Application Ser. No. 62/283,952 filed on Sep. 15, 2015.

BACKGROUND a. Field of the Invention

The present invention relates generally to an apparatus for cleaning diesel exhaust particulate collectors, such as diesel particulate filters (DPF), diesel oxidation catalysts (DOC), and similar emission control components, and, more particularly, to a cleaning system that employs fluid pulses or surges applied to ends of a DPF, DOC or other diesel exhaust particulate collector to dislodge and remove accumulated material from the collector.

b. Related Art

Diesel particulate filters and similar emissions components are employed to collect noxious materials from exhaust streams of diesel engines, primarily in the form of particulates comprised mainly of soot. The most common types of diesel particulate filters (DPF) include wall-flow DPFs that are highly efficient in removing particulate, as well as diesel oxidation catalysts (DOC), that tend to be less efficient with respect to particulate removal but operate to reduce the organic component of the collected soot. In the following description and the appended claims such components will be referred to collectively using the terms diesel particulate collector, diesel particulate filter, DPF (or DPF/DOC), whether used with diesel engines or to collect materials from other exhaust streams.

DPFs feature a filter body formed of ceramic or other filter media capable of withstanding high exhaust temperatures, typically with a honeycomb structure of elongate tubes opening alternately to the intake (dirty) and outlet (clean) sides of the exhaust. The filter body is commonly housed within a shell formed of metal or other material and having inlet and outlet connections; in the case of DPFs used with trucks or busses, the intake end of the shell may connect to the exhaust pipe from the engine so as to lead the raw exhaust gas to the "dirty" side of the filter, while the other end of the shell may have a connection leading from the "clean" side of the filter to the atmosphere via an exhaust stack or similar pipe.

By virtue of their operation DPFs rapidly collect and remove particulates from the exhaust stream, commonly in the form of soot and/or ash but sometimes including particles of metallic material. Due to the high pressures and temperatures of the exhaust systems the particulate material is driven hard against the "dirty" side of the filter, where it eventually accumulates and builds up to the point of restricting the flow and reducing efficiency of the engine. DPFs consequently require periodic cleaning to remove the accumulated matter and return them to service, since due to their very substantial cost they are not normally considered disposable items.

Since much of the accumulated material adheres tenaciously to the filter medium, effectively cleaning the filters tends to be quite challenging. Jets of high pressure air have commonly been used, but while reasonably effective in many instances, the ability of air to remove the particulates is ultimately limited by the compressibility of air as a gas, and other factors. Water and other liquids have also been used, but the resistance offered by a filter medium originally designed for use with a gas rather than liquids presents difficulties, when trying to force the liquid through the medium with a pressure and flow that is to remove the deposits. In particular, the permissible pressure differential when using water or another liquid is severely limited, due to the potential for fracturing/rupturing the cellular walls and destroying the filter, with the result that much of the particulate is not removed.

Therefore, while both pressurized air/gas and water/liquid have previously been employed to clean DPFs, the ability of available systems to effectively remove particulate has often been significantly limited by factors such as those discussed above.

Accordingly, there exists a need for an apparatus and method for cleaning diesel particulate filters, including diesel oxidation catalysts and similar components, that provides an improved level of deposit removal without causing damage to the medium of the filters. Furthermore, there exists a need for such an apparatus and method that can be employed efficiently and quickly to remove deposits so as to provide a rapid and economical turnaround when cleaning filters used for trucks, busses and similar applications.

SUMMARY OF THE INVENTION

The present invention addresses the problems cited above, and provides a system for effective cleaning of diesel particulate filters, including diesel oxidation catalysts and similar particulate collection and/or reactions components. The invention provides an apparatus for a wet cleaning system using water or a water solution or other liquid that may be used with a dry cleaning system using air or other gas. The dry cleaning apparatus and the wet cleaning apparatus may be combined as cooperating sections of a single assembly or may be installed or employed as separate systems.

The wet cleaning system may drive a solid mass or slug of the cleaning liquid through the DPF/DOC to remove the particulate matter. The water may be driven by air pressure applied above/behind a surface of the mass or by other mechanisms, such as by a ram for example. The mass or slug of liquid may be surged or plunged back and forth through the medium of the filter to help dislodge and remove the particulates. The dislodged material may be removed from the cleaning liquid by a liquid particulate filter.

The dry cleaning system may employ pulses of air directed towards opposite "clean" and "dirty" sides of the DPF/DOC with the dislodged particulate being drawn off to a dust collector or otherwise disposed of. The system may include a cabinet in which the filter is housed for cleaning, and the discharge removed from the dirty side of the filter may pass through a viewing area for visual check by the operator. The dry cleaning system may also include a pressure differential check to determine cleaning efficacy.

In a preferred embodiment, the invention provides an apparatus for cleaning a diesel particulate filter having a dirty side directed towards an incoming flow of exhaust and a clean side directed towards an outgoing flow of exhaust, the apparatus comprising: (a) a dry cleaning system that employs a gas to clean particulate from the filter, the dry cleaning system comprising: a first gas supply conduit that is mountable in fluid communication with the clean side of the filter; a second gas supply conduit that is mountable in fluid communication with the dirty side of the filter; a pressure mechanism that applies pulses of the gas alternatingly against the clean and dirty sides of the filter through the first and second gas supply conduits; and (b) a wet cleaning system that employs a liquid to remove particulate from the filter, the wet cleaning system comprising: a first liquid supply conduit that is mountable in fluid communication to the clean side of the filter; a second liquid supply conduit that is mountable in fluid communication to the dirty side of the filter; and a pump mechanism that surges a slug of the liquid through the filter alternatingly from the clean and dirty sides of the filter through the first and second liquid supply conduits.

The pressure mechanism of the dry cleaning system may comprise a source of a compressed gas and a valve mechanism that alternately supplies the compressed gas from the source to the first and second gas supply conduits. The dry cleaning system may further comprise connector members that connect the first and second gas supply conduits to the filter with the clean side of the filter oriented generally upwardly and the dirty side of the filter oriented generally downwardly so that gravity aids in removing particulate from the filter. The dry cleaning system may further comprise a dust collector bucket mounted in the second gas supply conduit generally below the filter, that collects the particulate removed from the filter.

The dry cleaning system may also comprise at least one sensor that measures a pressure differential between the dirty and clean sides of the filter to assess a status of the filter.

In the wet cleaning system, the pump mechanism may comprise a pressure mechanism that applies a gas at alternating pressures to opposite sides of the slug of the liquid through the first and second liquid supply conduits. The pump mechanism may also comprise at least one hydraulic ram mechanism that alternatingly applies pressure to the slug of the liquid in opposite directions through the first and second liquid supply lines.

The wet cleaning system may further comprise at least one liquid particulate filter in communication with one of the first and second liquid supply conduits, that collects particulate material dislodged from the diesel particulate filter.

The apparatus may further comprise a cabinet assembly having the dry cleaning system and wet cleaning system mounted together therein.

In another preferred embodiment, the invention provides a method for cleaning a diesel particulate filter having a dirty side directed towards an incoming flow of exhaust and a clean side directed towards an outgoing flow exhaust, the method comprising the steps of: (a) dry cleaning the filer by employing a gas to clean particulate from the filter, the step of dry cleaning the filer comprising: mounting the clean side of the filter in fluid communication with a first gas supply conduit; mounting the dirty side of the filter in fluid communication with a second gas supply conduit; and alternatingly applying pressurized pulses of the gas against the clean and dirty sides of the filter through the first and second supply conduits; and (b) wet cleaning the filter by employing a liquid that removes particulate from the filter, the step of wet cleaning the filter comprising: mounting the clean side of the filter in fluid communication with a first liquid supply conduit; mounting the dirty side of the filter in fluid communication with a second liquid supply conduit; and surging a slug of the liquid through the filter alternatingly from the clean and dirty sides of the filter through the first and second liquid supply conduits.

The step of alternatingly supply pulses of the gas against the clean and dirty sides of the filer may comprises alternatingly supplying a compressed gas from a source to the first and second gas supply conduits. The step of dry cleaning the filter may further comprise connecting the first and second gas supply conduits to the filter with the clean side of the filter oriented generally upwardly and the dirty side of the filter oriented generally downwardly, so that gravity aids in removing particulate from the filter. The step may further comprise collecting the particulate removed from the filter in a dust collection bucket mounted in the gas supply conduit generally below the filter. The method may further comprise measuring a pressure differential between the dirt and clean sides of the filer to assess a status of the filter.

The step of surging the slug of the liquid through the filter may comprise applying a gas at alternating pressures to the sides of the slug of the liquid through the first and second liquid supply conduits. The step of surging the slug of the liquid through the filter may also comprise operating at least one hydraulic ram to alternatingly apply pressure to the slug of the liquid in opposite directions through the first and second liquid supply lines.

In another preferred embodiment, the invention provides a method for cleaning a diesel particulate filter having a dirty side directed towards and incoming flow of exhaust and a clean side directed towards an outgoing flow of exhaust, the method comprising the steps of: dry cleaning said filter by employing a gas to clean particulate from said filter, the step of dry cleaning the filter comprising: mounting the clean side of the filter in fluid communication with a first gas supply conduit; mounting the dirty side of the filter in fluid communication with a second gas supply conduit; and alternatingly applying pressurized pulses of the gas against the clean and dirty sides of the filter through the first and second supply conduits. The method may further comprise the step of measuring a pressure differential of the gas between said dirty and clean sides of said filter to assess a status of said filter.

In another embodiment, the invention provides a method for cleaning a diesel particulate filter having a dirty side directed towards an incoming flow of exhaust and a clean side directed towards and outgoing flow of exhaust, the method comprising the steps of: lead cleaning the filter employing a liquid that removes particulate from the filter, the step of wet cleaning the filer comprising: mounting the clean side of the filter in fluid communication with a first liquid supply conduit; mounting the dirty side of the filter in fluid communication with a second liquid supply conduit; and surging a slug of the liquid through the filter alternatingly from the clean and dirty sides of the filter through the first and second liquid supply conduits. The step of surging the slug of the liquid through the filter may comprise applying a gas at alternating pressures to opposite sides of the slug of the liquid through the first and second liquid supply conduits.

These and other features and advantages of the invention will be more fully appreciated from a reading of the following detailed description with reference to the accompanying drawings.

DETAILED DESCRIPTION

Figure 1:
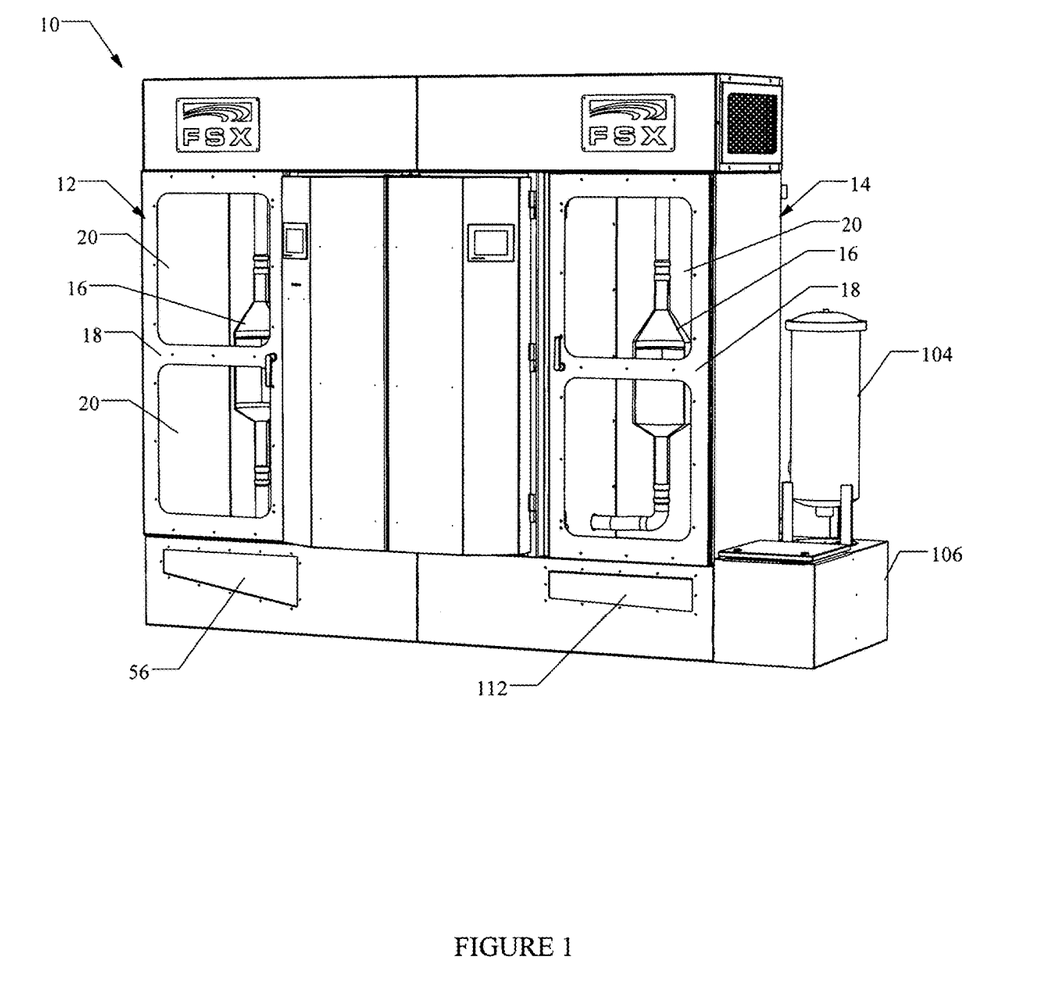
FIG. 1 is a front perspective view of a combination dry/gas and wet/liquid filter cleaning system in accordance with the present invention, with first and second DPFs connected for cleaning in the dry and wet sides of the system being visible through windows in doors at the front of the assembly.

FIG. 1 shows a filter cleaning system 10 in accordance with a preferred embodiment of the present invention. The illustrated embodiment includes both a dry cleaning section 12 that employs air or other gas to clean the filter and a wet cleaning section 14 that employs water or other liquid, which enhances efficiency and speeds workflow, however it will be understood that the dry cleaning and wet cleaning sections may be installed or used separately or one without the other.

As can be seen with further reference to FIG. 1, each of the cleaning sections 12, 14 includes a cleaning chamber in which are placed the filters 16 being cleaned, and which are accessed at the front of the assembly via doors optionally having windows through which an operator can observe the filters and associated fittings during the cleaning process.

As will be described in greater detail below, the dry cleaning section provides cleaning of the filters using air or other gas as a fluid, and collection of the dislodged dust from the flow of gas, and also provides a differential pressure test to check cleaning progress and filter integrity, while the wet cleaning section provides cleaning of the filters using water or other liquid as the fluid and filtration of the liquid to remove the dislodged particulate.

As will be described in greater detail below, the dry cleaning section provides cleaning of the filters using air or other gas as the fluid, and collection of the dislodged dust from the flow of gas, and may also provide a differential pressure test to check cleaning progress and filter integrity, while the wet cleaning section provides cleaning of the filters using water or other liquid as the fluid, and filtration of the liquid to remove the dislodged particulate. In the following description, unless otherwise distinguished, the term "air" includes atmospheric air as well as other gasses, and the term "water" includes ordinary tap water, as well as aqueous and non-aqueous solutions and other liquids.

a. Dry Cleaning Section

Figure 2:
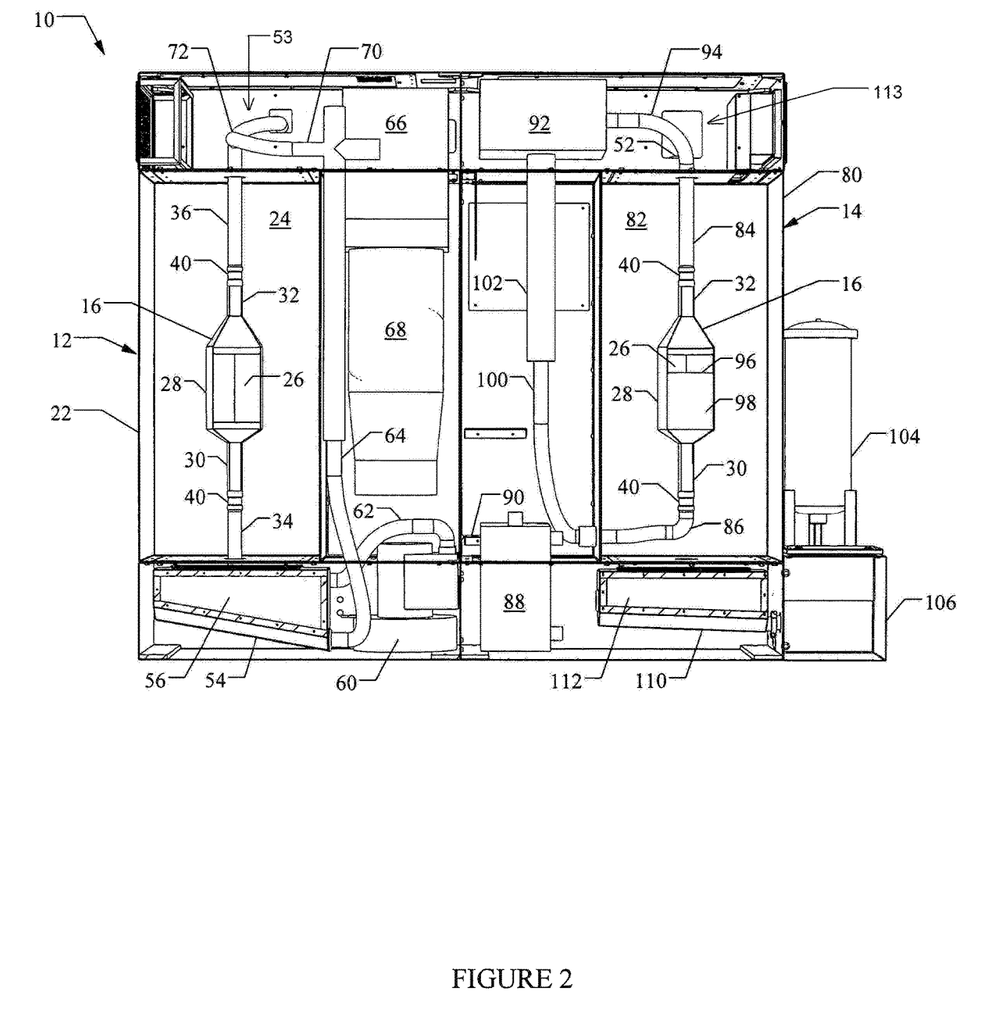
FIG. 2 is a front perspective view of the system of FIG. 1 with the front panels and doors removed, showing in greater detail the two DPFs and the wet and dry cleaning systems that are connected thereto.
Figure 3:
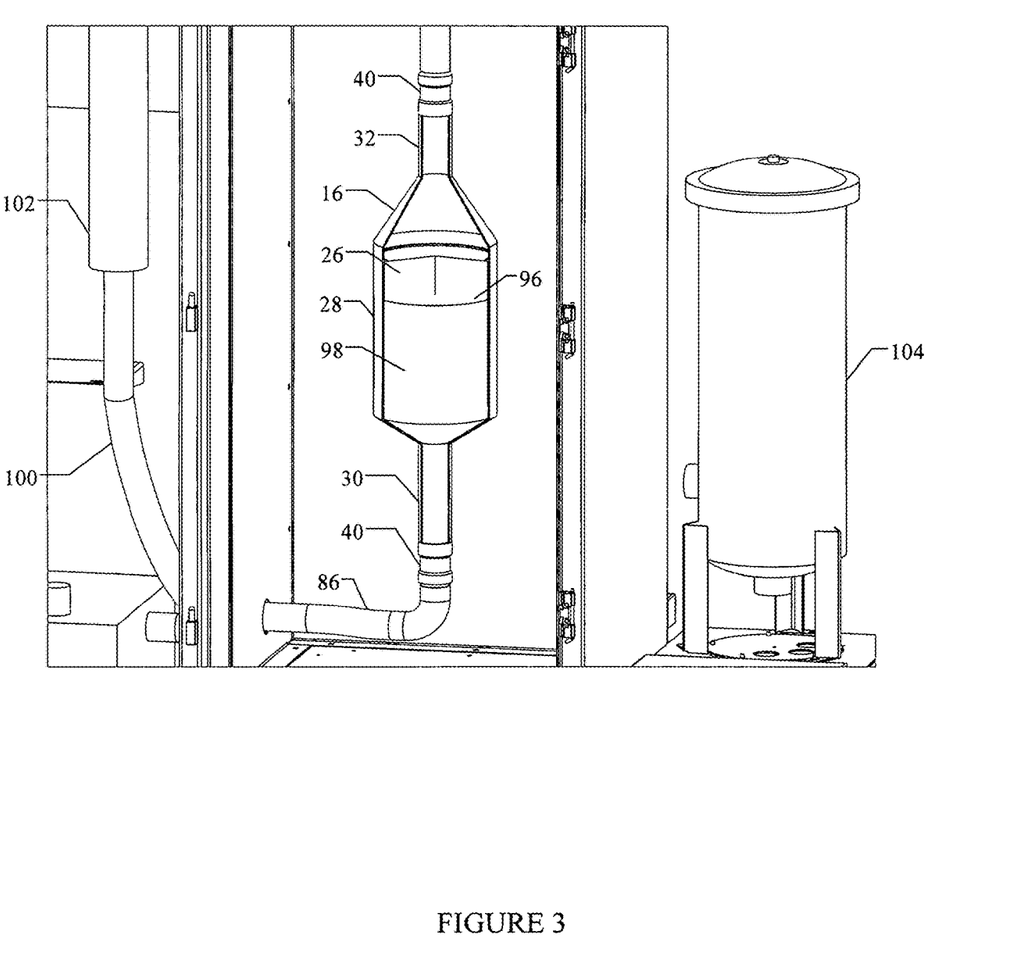
FIG. 3 is an enlarged perspective view of the filter undergoing cleaning on the wet/liquid side of the system of FIGS. 1-3, the filter being shown partly cut away to reveal the filter body and other internal aspects of the DPF.
Figure 4:
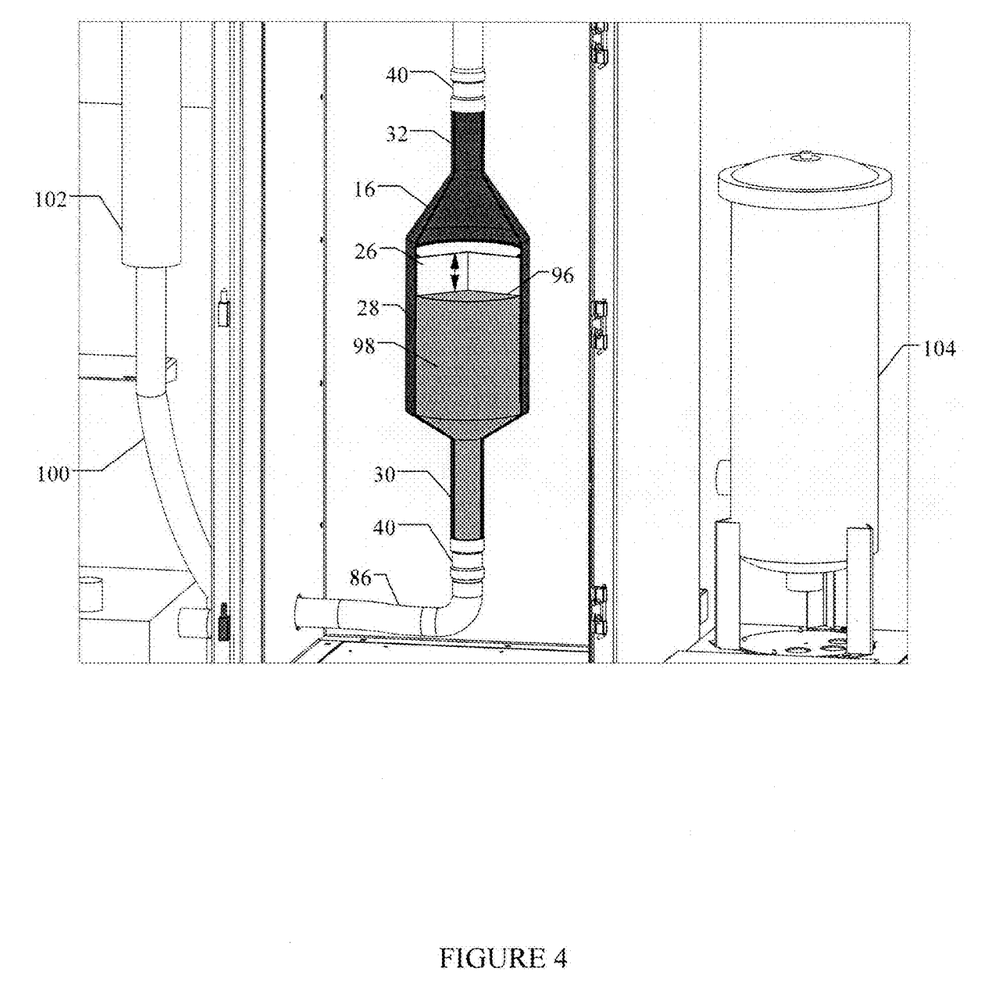
FIG. 4 is a second enlarged perspective view of the connected DPF of FIG. 3, showing the manner in which a mass of water is surged back and forth through the body of the filter.

As can be seen in FIG. 2, the dry cleaning section 12 includes a cabinet 22 having a door 18, suitably equipped with viewing windows 20, that provides access to a cleaning chamber 24 in which the filter 16 while it is cleaned. The latter filter is preferably installed in a generally vertical orientation as shown with the intake "dirty" side down and the outlet "clean" side up so that gravity aids in removing the dislodged particulate. For purposes of illustration the filters are shown partially cutaway to reveal the filter body 26 contained within a metal housing 28, as is typical of DPFs employed for road-going vehicles, for example. The intake and outlet pipes 30, 32 are aligned generally vertically and are connected to gas supply conduits in the form of air pipes 34, 36, suitably by adaptors and quick-connect fittings 40 at the ends.

Figure 5:
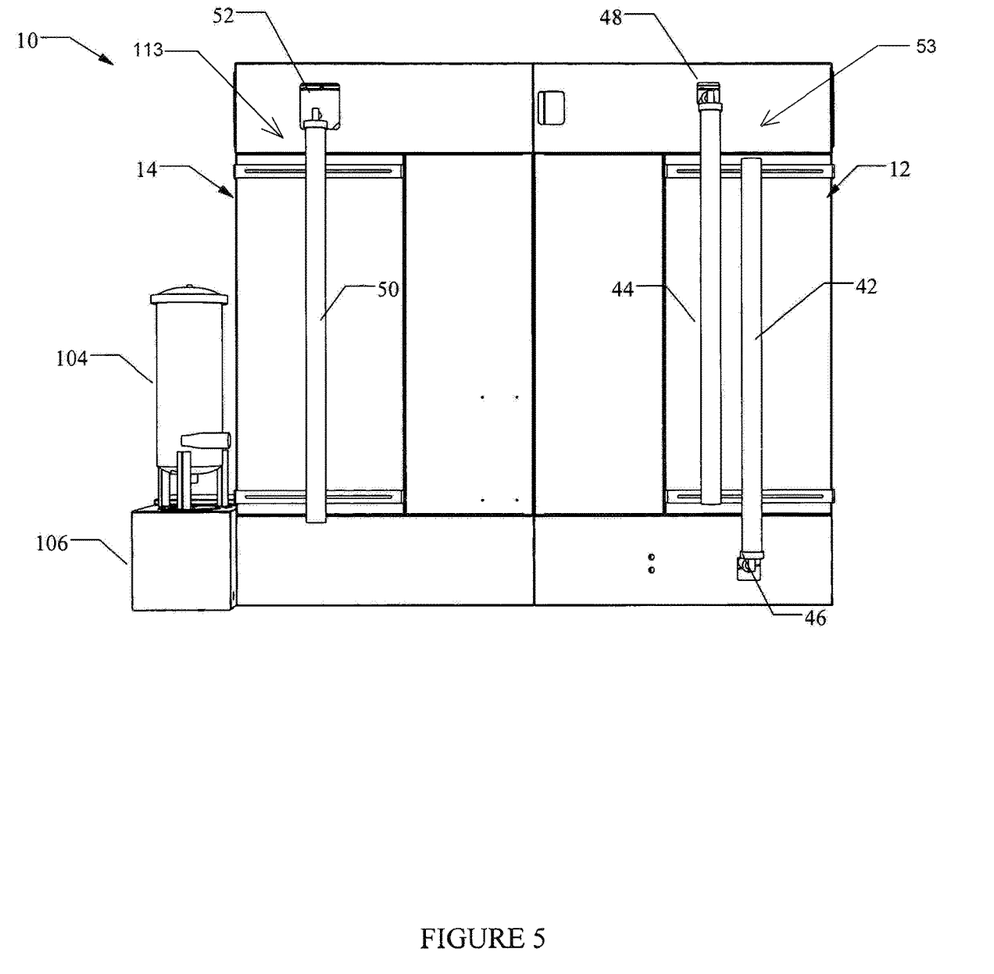
FIG. 5 is a rear perspective view of the combination dry and wet filter cleaning system of FIG. 1.

Air pressure is supplied to connector lines 34, 36 from reservoir tanks 42, 44 at the rear of the cabinet (see FIG. 5) via solenoid valves 46, 48; the reservoir pipes 42, 44 are filled with high pressure air from a compressor or other suitable source (not shown), which is released as comparatively high pressure pulses via lines 34, 36 when the solenoid valves are opened. The reservoir tanks may suitably be formed of lengths of 3" diameter pipe, for example. A second reservoir tank 50 and a solenoid valve 52 are similarly installed on the backside of the wet cleaning section, for use as will be described below.

Therefore, when solenoid valve 48 is opened, a pulse of pressurized air is directed through line 36 against the outlet or "clean" side of the filter 16, forcing air through the medium of the filter and dislodging accumulated particulate material from the downwardly facing "dirty" side. The particulate material drops through the intake pipe 30 of the filter and through line 34 into a collection bucket 54 having a window 56 that is open to view at the front of the assembly so that the operator can visually check the amount of material that has been removed. After one or more pulses in the first direction, one or more pulses in the opposite, reverse direction may be applied to the filter by opening the other solenoid valve 46 so that the pulses impinge on the inlet "dirty" side of the filter body to aid in loosening and freeing the deposits.

One example sequence for cleaning a filter using the dry cleaning section is as follows, it being understood that the example is provided by way of illustration rather than limitation and that the steps may vary depending on embodiment and circumstances, such as filer type, size and condition, for example:

a. Apply 3-5 pulses of air to the clean end. The pressure, duration and number of pulses (1 or more) may be varied as needed.

b. Apply 1-2 pulses of air to the dirty end. Again, the pressure, duration and number of pulses may be varied as needed.

c. During application of the pulses to the clean end (outlet) of the DPF, soot and ash are blown out of the filter. This may be observed by an operator to assess cleanliness and/or integrity of the filer; optionally a particulate sensor may monitor the soot and ash blown out of the filter in place of or in addition to use of the viewing area.

d. During application of the pulses to the dirty end (inlet) of the DPF, the air that passes through and out of the clean end (outlet) of the filter may be monitored by a sensor that measures particulate carried by the flow.

e. Steps a-d may be repeated as necessary until no more soot or ash is observed/measured in steps c/d.

After or during the cleaning sequence, a differential pressure measurement may be taken to measure how effectively the DPF has been cleaned. A flow of air is supplied from a blower 60 or other suitable source via lines 62 and 34 and passed through the body 26 of the filter at a measured volume and/or pressure. The differential pressure is measured across the DPF and compared to reference values for a new filter. The effectiveness of the cleaning may be graded based on the comparison of the measured and reference differentials, to determine whether the filter has been adequately cleaned for return to service or additional cleaning is needed. The comparison can also be used as a test of filter integrity, with failure/damage indicated by a differential less than that of a new filter.

Particulate that has been dislodged from the intake "dirty" side of the DPF and collected in bucket 54 may be drawn off through a suction line 64 by a fan 66 at the upper end of a dust collector 68. Similarly, material that has been dislodged from the outlet "clean" side of the filter can be drawn off via a suction line 70, that is connected to the upper line 36 at a "T" 72. The dust collector can therefore also take a suction on either end of the filter; for example, when pulsing the filter on the "clean" end, the dust collector may draw a suction on the dirty end and vice versa.

Dust collector 68 may include an internal pulse line that is located within the primary filter, to facilitate removal of soot/ash from the latter. The dislodged soot and ash fall to the bottom of the dust collector for removal, e.g., via a bucket or an external vacuum source.

b. Wet Cleaning Section

Similar to the dry cleaning section described above, the wet cleaning section 14 includes a cabinet 80 having a chamber 82 that encloses the filter 16 and that is accessible via a door 18 at the front. First and second fluid lines 84 and 86 form liquid supply conduits. The first line 84 is connected to the outlet pipe 32 on the clean side of the filter, using an adaptor and quick-connect coupler 40, for example, and the second line 86 is similarly connected to the inlet pipe on the "dirty" side of the filter. Water is supplied to a mixing and recirculation tank 88 from a tap or other source via line 90, and may be mixed with chemical additives to form liquid cleaning solution as desired; tank 88 may incorporate a heater for heating the solution to increase its cleaning effectiveness.

From tank 88 the solution is pumped to a primary solution tank 92 that is located on the upper part of the assembly, above the level of the DPF/DOC that is being cleaned. Upon opening a valve, the solution flows from tank 92 down through lines 94 and 84, so as to fill a volume above the body of the filter with a solid mass or "slug" of liquid. Air pressure is then applied to the top of the slug from reservoir 50 (see FIG. 5) by opening solenoid valve 52, generating a downward pressure that works in conjunction with gravity to force the liquid solution through the medium of the filter body. As this is done, the liquid flow dislodges the particulate from the filter, so that the dislodged material passes down through the intake pipe of the filter and into line 86, along with the liquid that has flowed through the filter. With continued flow, the upper surface 96 of the slug 98 may reach the body 26 of the filter so that the pressurized air follows the liquid into the filter medium, depending on the intended cleaning cycle.

From line 86, the liquid solution flows generally horizontally and then vertically through upwardly leading line 100 to a pressurized storage tank 102 at its upper end. The pressurized tank holds a volume of the fluid, with a pressurized blanket of the air or other gas at the top. Particulate material that was dislodged from the filter and carried through line 86 is drawn off and extracted by a liquid particulate filter 104, being circulated back to tank 88. The particulate material collected by filter 104 is in turn discharged to a sediment collection tank 106 for subsequent disposal. Any liquid that spills in chamber 82 is similarly collected in tank 106, via a drain opening 108 and a sluice bucket 110 having a viewing window 112.

The liquid filtration system using filter 104 may also be used to perform processing of cleaning solutions, to remove soot, ash and other particulates, particularly if multiple solutions are used and it is desirable to keep spent solutions separated. For standalone operations, the system may in addition employ an initial settling tank to allow gravitational removal of heavy solids, and one or more filters to remove additional soot and ash as well as chemical treatment to change solution chemistry.

As noted above, the liquid solution that has passed through the DPF to the "dirty" side of the filter accumulates under pressure in line 100 and tank 102. Thus, by realigning the valves of the system the same mass of liquid solution can be driven in a reverse direction from the dirty side back towards the clean side of the filter, after which the sequence may be repeated. It has been found that thus working the liquid solution back-and-forth through the medium of the filter with a surging or plunging action is highly effective at removing the deposits.

The steps in an example cleaning cycle using the wet cleaning section are set forth below:

(1) The DPF is installed in the wet cleaning chamber using the fluid connections, preferably with this clean side oriented upwardly.

(2) A pressure test may be performed to check for leaks.

(3) If the filter was not previously cleaned using the dry system, a pre-cleaning differential pressure measurement may be taken.

(4) The DPF is filled with heated cleaning solution. Extra solution is loaded into the conduit system to form a liquid slug, preferably sufficient to extend beyond the inlet and outlet of the DPF.

(5) The slug of solution is "surged" back and forth through the filter using the pressure mechanism of the wet wash system, in a manner described below.

(6) Pressurized air is applied on top of the slug of cleaning solution, from the plumbing that is connected to the outlet (clean end) of the DPF. The air pressure and duration of application are variable. At the same time, a vent valve is opened on the plumbing connected to the inlet (dirty end) of the DPF. Due to the force of the pressurized air, the cleaning solution moves through the DPF from the outlet towards the inlet, removing soot and/or ash in the process. In place of or addition to pressurized air/gas other embodiments may employ other mechanisms to surge the slug back-and-forth, such as one or more hydraulic rams/pistons that act directly or indirectly on the liquid of the slug, for example.

(7) Soot and ash that have been removed from the DPF settle into a trap at a "Tee" in the plumbing on the inlet side of the filer.

(8) The pressure and vent valves are turned off.

(9) Pressurized air is next applied to the opposite side of the slug of cleaning solution, from the plumbing connected to the inlet (dirty end) of the DPF. The pressure and duration of application are again variable. At the same time, a vent valve is opened on the plumbing connected to the outlet (clean end) of the DPF. Due to the force of the pressurized air, the slug of cleaning solution moves in a reverse direction through the DPF, from the outlet end towards the inlet end of the filter. The pressure applied in this second direction is preferably significantly less than the pressure used in the first, primary cleaning direction, so as to move the liquid slowly back to the outlet side of the filter in preparation for another cleaning cycle without driving ash and soot back into the DPF.

(10) When the cleaning solution reaches a predetermined level as measured in the plumbing attached to the outlet side of the DPF, the air pressure and vent valves are closed.

(11) Cleaning cycle steps 6-10, pushing the slug of liquid back-and-forth through the filter, may be repeated as few or many times as needed. After repeating steps for the necessary number of cycles 6-10, the following steps 12-14 may optionally be performed:

(12) Pressurized air is applied on top of the cleaning solution from the plumbing connected to the outlet (clean end) of the DPF. The air pressure and duration of application may be varied as needed.

(13) A drain valve is temporarily opened below the trap or "Tee" described in step 7. Soot, ash and solution are removed and sent to the filtration system through a viewing chamber or tube that allows the soot/ash/solution mixture to be viewed by an operator. The DPF is not completely drained of cleaning solution.

(14) Additional solution is loaded at the outlet end of the DPF to make up for the volume removed in step 15. These amounts may or may not be equal.

(15) Cleaning cycle steps 6-14 may be repeated until soot and/or ash are no longer observed coming out of the DPF via the viewing tube/chamber. Manual viewing of the particulate soot/ash and cleaning solution discharged from the filter may be augmented or replaced by use of a sensor mechanism that monitors levels of the material particulate in the flow.

After the wet cleaning process has been completed, the filter may be dried, for example, by the following steps:

(16) All remaining soot, ash and cleaning solution are drained from the DPF and the connected plumbing.

(17) Pressurized air is applied to the DPF via the plumbing connected to the outlet (clean) end of the filter. The pressure and volume of air may be varied as needed.

(18) A valve in the plumbing connected to the inlet (dirty) end of the DPF is opened to the wet cleaning chamber. A vapor capture system (e.g., a spin-down charcoal filer or similar device) may also be attached to the wet cleaning chamber.

(19) The pressurized air applied to the clean end of the filter blows the cleaning solution out of the filter through the dirty end and into the cleaning cabinet, from which the liquid then drains.

(20) Steam and water droplets condense and fall out in the expanded volume of the cleaning chamber. The resulting reduced moisture air is vented from the cleaning chamber, for example, via the attached vapor capture system. Dry air exiting the vapor capture system can be additionally filtered if needed.

(21) Additionally, the clean, dry air discharged from the cleaning system may be HEPA filtered before being vented into the operator space or outside as desired.

(22) Drying a final differential air pressure measurement may be performed to check cleanliness/integrity of the filter.

c. Control System

Operation of the cleaning system may be controlled by a PLC or similar computer system. The operator may, for example, input the DPF part number, serial number and/or other data into the control system at the beginning of the cleaning cycle. The control system may indicate operational status and may provide the operator with readings and warnings, using a display or indicators, for example, and may also send cleaning data to external computers or databases.

The dry and wet cleaning sections may have individual controls and may be able to operate simultaneously using shared components. When the dry and wet sections both need to access a shared component, the first one to need it may have use of the shared component while the other side may enter a "wait" cycle until the shared component becomes available for its use in turn. Simultaneous operation may then resume and continue.

It will be understood that the scope of the appended claims should not be limited by particular embodiments set forth herein, but should be construed in a manner consistent with the specification as a whole.

What is claimed is:

1. An apparatus for cleaning a diesel particulate filter having a dirty side directed towards an incoming flow of exhaust and a clean side directed towards an outgoing flow of exhaust, said apparatus comprising:
   a wet cleaning system that employs a liquid to remove particulate from said diesel particulate filter, said wet cleaning system comprising:
      a first liquid supply conduit that is mountable in fluid communication to said clean side of said diesel particulate filter;
      a second liquid supply conduit that is mountable in fluid communication to said dirty side of said diesel particulate filter; and
      a pump mechanism that surges a slug of said liquid through said diesel particulate filter alternatingly from said clean and dirty sides of said diesel particulate filter through said first and second liquid supply conduits;
      wherein said slug of said liquid that is surged through said diesel particulate filter alternately from said clean and dirty sides thereof is substantially the same mass of said liquid surged in both directions.

2. A method for cleaning a diesel particulate filter having a dirty side directed towards an incoming flow of exhaust and a clean side directed towards an outgoing flow of exhaust, said method comprising the step of:
   wet cleaning said filter employing a liquid that removes particulate from said diesel particulate filter, the step of wet cleaning said filter comprising the steps of:
      mounting said clean side of said diesel particulate filter in fluid communication with a first liquid supply conduit;
      mounting said dirty side of said diesel particulate filter in fluid communication with a second liquid supply conduit; and
      surging a slug of said liquid through said diesel particulate filter alternatingly from said clean and dirty sides of said diesel particulate filter through said first and second liquid supply conduits;
      wherein said slug of said liquid that is surged through said diesel particulate filter alternately from said clean and dirty sides thereof is substantially the same mass of said liquid surged in both directions.

3. The method of claim 2, wherein the step of surging said individual slug of said liquid through said diesel particulate filter comprises:
   applying a gas at alternating pressures to opposite sides of said individual slug of said liquid through said first and second liquid supply conduits.

4. The method of claim 2, further comprising the step of:
   dry cleaning said diesel particulate filter by employing a gas to clean particulate from said diesel particulate filter, the step of dry cleaning said diesel particulate filter comprising the steps of:

mounting said clean side of said diesel particulate filter in fluid communication with a first gas supply conduit;

mounting said dirty side of said diesel particulate filter in fluid communication with a second gas supply conduit; and alternatingly applying pressurized pulses of said gas against said clean and dirty sides of said diesel particulate filter through said and first second gas supply conduits.

5. An apparatus for cleaning a diesel particulate filter having a dirty side directed towards an incoming flow of exhaust entering an intake of said diesel particulate filter and a clean side directed towards an outgoing flow of exhaust exiting an outlet of said diesel particulate filter, said apparatus comprising:

a wet cleaning system that employs a liquid to remove particulate from said diesel particulate filter, said wet cleaning system comprising:

a first liquid supply conduit that is mountable in fluid communication to said clean side of said diesel particulate filter;

a second liquid supply conduit that is mountable in fluid communication to said dirty side of said diesel particulate filter; and a pump mechanism that surges a slug of said liquid through said diesel particulate filter alternatingly from said clean and dirty sides of said diesel particulate filter through said first and second liquid supply conduits so as to dislodge particulate from said diesel particulate filter, wherein said pump mechanism comprises a pressure mechanism that alternately applies a pressurized gas to said first and second liquid supply conduits on opposite ends of said slug of said liquid;

wherein said pressure mechanism alternately applies pressure in opposite directions to at least one end of said slug of said liquid; and wherein said slug of said liquid is driven in a reverse direction from said dirty side to said clean side of said diesel particulate filter with significantly less pressure relative to the pressure in the direction from said clean side to said dirty side of said diesel particulate filter so as to slowly move said liquid and dislodged particulate back out said dirty side and said intake of said diesel particulate filter.

6. The apparatus of claim 5 in which one end of said slug of said liquid comprises an upper surface which reaches said diesel particulate filter so that said pressurized gas follows said liquid into said diesel particulate filter from said clean side.

7. The apparatus of claim 6 in which said pressurized gas is applied to said upper surface of said end of said slug of said liquid to generate a downward pressure to force said liquid through said diesel particulate filter from said clean side to said dirty side, and to flow said liquid through said second supply conduit to a pressurized storage tank adapted to hold a volume of said liquid with a pressurized blanket of gas at a top of said volume of said liquid in said storage tank.

8. A method for cleaning a diesel particulate filter having a dirty side directed towards an incoming flow of exhaust entering an intake of said diesel particulate filter and a clean side directed towards an outgoing flow of exhaust exiting an outlet of said diesel particulate filter, said method comprising the step of:

wet cleaning said diesel particulate filter employing a liquid that removes particulate from said diesel particulate filter, the step of wet cleaning said diesel particulate filter comprising the steps of:

mounting said clean side of said diesel particulate filter in fluid communication with a first liquid supply conduit;

mounting said dirty side of said diesel particulate filter in fluid communication with a second liquid supply conduit; and surging a slug of said liquid through said diesel particulate filter alternatingly from said clean and dirty sides of said diesel particulate filter through said first and second liquid supply conduits so as to dislodge particulate from said diesel particulate filter;

wherein the step of surging said slug of said liquid through said diesel particulate filter comprises:

applying a gas at alternating pressures through said first and second liquid supply conduits whereby pressure is alternatively applied in opposite directions to at least one end of said slug of said liquid;

driving said slug of said liquid in a reverse direction from said dirty side to said clean side of said diesel particulate filter with significantly less pressure relative to the pressure in the direction from the clean side to the dirty side of said diesel particulate filter so as to slowly move said liquid and dislodged particulate back out said dirty side and said intake of said diesel particulate filter.

9. The method of claim 8, wherein the step of applying a gas of alternating pressures comprises:

alternatingly supplying a pressurized gas from a source to said first and second liquid supply conduits.

10. The method of claim 9, wherein one end of said slug of said liquid comprising an upper surface reaches said diesel particulate filter so that the pressurized gas follows the liquid into said diesel particulate filter from the clean side.

11. The method of claim 10, further comprising the step of:

applying said pressurized gas to said upper surface of said end of said slug of said liquid to generate a downward pressure to force said liquid through said diesel particulate filter from said clean side to said dirty side, and to flow said liquid through said second supply conduit to a pressurized storage tank adapted to hold a volume of said liquid with a pressurized blanket of gas at a top of said volume of said liquid in said storage tank.

12. An apparatus for cleaning a diesel particulate filter having a dirty side directed towards an incoming flow of exhaust and a clean side directed towards an outgoing flow of exhaust, said apparatus comprising:

a wet cleaning system that employs a liquid to remove particulate from said diesel particulate filter, said wet cleaning system comprising:

a first liquid supply conduit that is mountable in fluid communication to said clean side of said diesel particulate filter;

a second liquid supply conduit that is mountable in fluid communication to said dirty side of said diesel particulate filter; and a pump mechanism that surges a slug of said liquid through said diesel particulate filter alternatingly from said clean and dirty sides of said diesel particulate filter through said first and second liquid supply conduits;

wherein said pump mechanism comprises a pressure mechanism that alternately applies a pressurized gas to said first and second liquid supply conduits on opposite ends of said slug of liquid, whereby said pressure mechanism alternately applies pressure in opposite directions to at least one end of said slug of said liquid; and wherein one end of said slug of said liquid comprises an upper surface which reaches said filter so that said pressurized gas follows said liquid into said diesel particulate filter from said clean side.

13. The apparatus of claim 12 in which said pressurized gas is applied to said upper surface of said end of said slug of said liquid to generate a downward pressure to force said liquid through said diesel particulate filter from said clean side to said dirty side, and to flow said liquid through said second supply conduit to a pressurized storage tank adapted to hold a volume of said liquid with a pressurized blanket of gas at a top of said volume of said liquid in said storage tank.

* * * * *